United States Patent Office 3,207,608
Patented Sept. 21, 1965

3,207,608
METHOD OF TENDERIZING BEEF
William L. Brown, Donald Denny, and Morton L. Schmucker, Ottumwa, Iowa, assignors to John Morrell & Co., Ottumwa, Iowa, a corporation of Maine
No Drawing. Filed Sept. 26, 1962, Ser. No. 226,467
3 Claims. (Cl. 99—107)

This invention relates generally to a process of tenderizing meats. More particularly, the present invention relates to a method of tenderizing beef through injecting the beef with an aqueous solution of salt and phosphates.

The advantages of tenderizing meats, particularly beef, are many and most are obvious, such as the personal satisfaction when the meat is eaten. Increasing the tenderness of meats also makes it possible to prepare more cuts and lower cost cuts by frying, broiling, grilling, etc., as opposed to roasting, boiling, etc., normally required for less tender cuts. Increased tenderness further permits shorter cooking times to achieve acceptable tenderness.

Because of the importance of tenderizing, much study has been made of the problem. Many methods of tenderizing have been suggested. Among these are found aging, high temperature aging, enzyme application onto or into meat, enzyme injection into live animals prior to slaughter, diathermal tenderization, ultrasonic tenderization, etc. These approaches had limitations, viz., uncontrollable biological or enzymatic activity that adversely affected flavor or appearance, uncontrolled tenderizing leaving some meat still tough while other meat became mushy, possible action of the enzyme after human consumption, uncontrollable tenderizing action when product is held by the dealer or in the home or when it is held warm for serving, differences in tenderizing due to differences in cooking schedules for rare and well-done meat, expensive tenderizing equipment or equipment operation, et al.

It has also been broadly suggested, such as in Allen 2,140,781, that an aqueous composition of phosphate and salt can be injected in meat to tenderize the meat. However, it has been found that the amount of injection or pump can produce significant variations in the tenderness. Hopkins 2,999,019 discloses an aqueous solution of 1% by weight sodium pyrophosphate and 10% to 22% by weight sodium chloride which are injected into the meat up to 10% by weight of the meat. In the patent to Barnett, 2,903,366, is found the teaching that 0.5% to 5.0% by weight phosphate in salt, sugar, sodium nitrite and sodium nitrate solution can be pumped into meat up to 12% by weight of the meat.

These patents which teach broadly the pumping of aqueous solutions of phosphate, salt, into meats, do not, however, achieve the tenderness and control of the tenderness which has been desired. There are many other prior art attempts using various phosphates and brines, as evidenced by the numerous patents in the field, to achieve a high quality tender meat but have met with limited success.

Accordingly, it is the principal object of the present invention to provide a superior process of tenderizing meats, particularly beef.

Another object of this invention is the provision of a method for tenderizing in which the amount of tenderizing can be controlled to prevent mushiness in texture of the meat.

Another object of this invention is to provide a method of tenderizing meats which does not depend upon any particular degree of cooking to achieve the desired tenderness.

It is another and more particular object of the present invention to provide a method of tenderizing meat, particularly beef, through injections of common and readily available materials.

Other objects and advantages of the present invention will become apparent to those skilled in the art, from the following description.

Briefly, the present invention is the product of the unique discovery that superior tenderness of meats and particularly beef is achieved by pumping or injecting into the meat from about 15% to 40% of an aqueous solution comprising approximately 2–10% and preferably 2–7% by weight salt and approximately 1% to 4% by weight phosphate. Preferably the amount of phosphate added to the meat is up to .5% by weight and the salt concentration in the meat between approximately .7% to 1.8% by weight.

It has also been discovered that the amount of the solution pumped (weight per unit weight of meat) produces a synergistic effect with the phosphate when in a concentration of about 1% to 4% by weight and the salt when in a concentration of about 2.5% to 7% by weight. For instance, a pump of about 10% or less of a solution of phosphate and salt will not produce the results in tenderizing meats that an approximately 15% pump and greater will produce.

The following data and test results will clearly indicate the areas of invention and advantages attendant to it.

Every test involving direct comparison was made on the same muscle of one animal. When three or four comparisons were involved, the boneless loin (longissimum dorsi) of a canner-cutter grade animal was used. With one or two comparisons, the bottom muscle of the outside round (semitendinosus biceps femoris), a muscle known for lack of tenderness was used. The control sample was unpumped but otherwise handled the same as test product. Tenderness was tested after four to eight days holding at 36–40° F. to duplicate normal shipping and delivery time for meat. Tenderness was evaluated by various methods which included a trained laboratory panel, group panels, a consumer panel, pounds cutting pressure of a newly sharpened knife, L.E.E. Kramer Shear Press, etc. Since most measurements ultimately are correlated to a panel finding and since the final tenderness evaluation depends upon actual mastication or eating values, the results are reported in terms of panel acceptance.

*Example 1*

A beef boneless loin was cut into four equal sections. These were pumped as shown on the following table. Each was vacuum packaged in a plastic bag per standard plant procedure for wholesale cuts. The meats were then rated for tenderness after seven days at 36–40° F. to approximate the time for shipping and handling before sale to the consumer.

| Percent pump | Marinade, percent | | Added salt level in meat, percent | | Tenderness rating |
|---|---|---|---|---|---|
| | Sodium chloride | Phosphate | Sodium chloride | Phosphate | |
| None | None | None | None | None | Tough. |
| 3.0 | 22.6 | 5.83 | 0.7 | 0.175 | Do. |
| 10 | 8.8 | 5.0 | 0.88 | 0.5 | Few tender. |
| 15 | 5.87 | 3.3 | 0.88 | 0.5 | Most tender. |
| 20 | 4.4 | 2.5 | 0.88 | 0.5 | Do. |
| 25 | 3.5 | 2.0 | 0.88 | 0.5 | Do. |
| 25.0 | 4.0 | 2.0 | 1.0 | 0.5 | Do. |

Some means have been pumped up to 40% and show the same marked increase in tenderness that is achieved with pumps of 15% to 25%. However, since the time required for pumping and the drainage loss increase markedly above 25% pump, further tests did not include the higher pump levels. The actual tenderizing effect of the pump level is evidenced by panel ratings on the same beef muscle.

| Percent pump | Tenderness rating | | Toughness rating | |
|---|---|---|---|---|
| | Tender | Mushy | Chewy | Fibrous residue |
| None | 1 | 0 | 6 | 1 |
| 20 | 7 | 0 | 0 | 0 |

It should be noted that at a 10% pump even with the phosphate and salt level in the meat identical to that of the 15% and greater pumps, the lesser pumped meat was not found to be as tender. The reason proposed for this is that the additional water pumped enhances or synergizes the effect of the phosphate and salt. From these results it is clear that a 10% pump is too low to achieve the beneficial results of the invention. The acceptable range of pump within the scope of the invention is approximately 15% to 40% but the preferred range is 20% to 25% pump.

Example 2

A boneless beef loin was cut into three approximately equal sections. These were all pumped to the same percent pump but with marinades containing varying levels of salt as shown below. Each piece was then vacuum packaged in plastic film, held 7 days at 36-40° F. to approximate shipping and handling, then rated for tenderness.

| Percent pump | Marinade, percent | | Added salt level in meat, percent | | Tenderness rating |
|---|---|---|---|---|---|
| | Sodium chloride | Phosphate | Sodium chloride | Phosphate | |
| 20 | None | 2.5 | None | 0.5 | Tough. |
| 20 | 4.8 | 2.5 | 0.96 | 0.5 | Tender. |
| 20 | 9.0 | 2.5 | 1.80 | 0.5 | Do. |

The meat with 1.8% sodium chloride had a salt flavor detected by and identified by the taste panel. These test results indicate that the salt component is essential to obtain a tenderizing action, that the salt content must be controlled, and adjusted to optimum consumer acceptance by balancing salt percent and percent pump. For instance, a salt concentration in the solution to be pumped as high as 9% or 10% or even slightly higher may be used but the percent pump preferably should be adjusted to achieve a salt level in the meat of about 1% and preferably less than 1.8%. Thus, a 15% pump of a solution containing the necessary phosphate and 9% salt would result in a 1.35% salt content in the meat which would be acceptable to most people.

Example 3

A boneless beef loin was cut into 4 approximately equal sections. Two of these were used to illustrate the tendering effect of the phosphate. For this, one piece was pumped 20% with a marinade containing 2.5% sodium tripolyphosphate and 4.8% sodium chloride as in Example 2. The other piece was used for a control. These subsequently received the following ratings by the trained laboratory panel:

| Sample code | Meat | Tenderness | | Toughness | |
|---|---|---|---|---|---|
| | | Tender | Mushy | Chewy | Fibrous residue |
| M | Phosphate | 5 | 0 | 1 | 0 |
| N | Control | 2 | 0 | 4 | 0 |

These data indicate the phosphate component of the marinade is essential to the tendering action. Normal production experience indicates that the amount of phosphate can readily be controlled by controlling the phosphate content of the marinade and the percent pump.

Example 4

A rib roll from a canner-cutter cow was stripped down to the single longissimus dorsi muscle. This was cut into eight approximately equal pieces (by weight). Using phosphates that were readily available in the laboratory, marinades were prepared and the above pieces pumped as shown below. All pieces were then vacuum packaged in plastic film and held 5 days at 36-38° to approximate normal shipping and holding. These were then rated by a trained tenderness exaluating panel.

| Piece | Pump | Marinade, percent | | Phosphate | Tenderness | | Toughness | |
|---|---|---|---|---|---|---|---|---|
| | | Sodium chloride | Phosphate | | Tender | Mushy | Chewy | Fibrous residue |
| M | None | None | None | No pump | 2 | 0 | 7 | 2 |
| N | 20 | 4.5 | None | Pump, no phos | 5 | 2 | 2 | 2 |
| O | 20 | 4.5 | 2.5 | Pyrophosphate | 7 | 0 | 2 | 0 |
| P | 20 | 4.5 | 2.5 | Tripolyphosphate | 8 | 0 | 2 | 1 |
| S | 20 | 4.5 | 2.5 | Acid pyrophos | 7 | 0 | 5 | 1 |
| T | 20 | 4.5 | 2.5 | Trisodium | 9 | 1 | 1 | 0 |
| V | 20 | 4.5 | 2.5 | Disodium | 8 | 1 | 2 | 0 |
| W | 20 | 4.5 | 2.5 | Hexameta | 4 | 2 | 5 | 2 |

It may be noted that some phosphates produce a greater tenderizing effect than others such as the tripolyphosphates and the trisodium and disodium phosphates while the hexametaphosphate is of lesser effect. This invention, however, is not limited to any particular phosphates. Accordingly, the term phosphates is to be interpreted in this specification and the following claims to include and not necessarily limited to all the above phosphates.

Example 5

A test was made to show that the desired tenderizing action was due to the synergistic combination of the pumping, the salt, and the phosphate, and that the resulting sum of these actions was greater than any of the components singly. A rib roll from a canner-cutter cow was cut into 4 approximately equal sections. Each was treated as follows:

M—(control)—no pump.
N—pumped 20% with a marinade containing 5% salt
O—pumped 20% with a marinade containing 2.5% soium tripolyphosphate
P—pumped 20% with a marinade containing 5% salt and 2.5% phosphate These were then vacuum packaged in plastic films and held at 36-38 degrees to approximate shipping and dealer handling. The samples were then grilled and rated by the trained laboratory panel. Data follows:

| Sample | Marinade, percent | | Added salt level in meat, percent | | Tenderness | | Toughness | |
|---|---|---|---|---|---|---|---|---|
| | Sodium chloride | Phosphate | Sodium chloride | Phosphate | Tender | Mushy | Chewy | Fibrous residue |
| M | None | None | None | None | 1 | 0 | 7 | 0 |
| N | 5 | None | 1 | None | 4 | 0 | 4 | 0 |
| O | None | 2.5 | None | 0.5 | 3 | 0 | 5 | 0 |
| P | 5 | 2.5 | 1 | 0.5 | 6 | 0 | 1 | 0 |

*Example 6*

To determine the effect of time on the tenderizing action and to observe this effect on the various components of the marinade, a loin from a canner-cutter cow was cut into 4 pieces and pumped as shown below. One slice was removed from each and the remaining was packaged in plastic film and held at 36–38 degrees. After 3 days, each package was opened, a slice removed for testing and the remaining repackaged and held at 36–38 degrees. At 7 days the remaining meat was tested for tenderness. The following data show that the meat was found to be tenderized immediately after pump; that the tenderizing increased somewhat with aging (due in part to the natural tenderizing of the natural enzymes and in part to the salts in the marinade); and that the combination of the salts was more effective than the individual salts.

| Percent pump | Sodium chloride, percent | Amounts in pumped meat, percent | | Phosphate, percent | Immediate | 3 days | 7 days |
|---|---|---|---|---|---|---|---|
| | | Phosphate | Sodium chloride | | | | |
| None | None | None | None | None | Least tender, chewy. | Least tender, chewy. | Least tender. |
| 20 | 5 | None | 1 | None | Least tender. | Tender. | Tender. |
| 20 | None | 2.5 | None | 0.5 | Tender. | do. | Most tender. |
| 20 | 5 | 2.5 | 1 | 0.5 | Most tender. | Most tender. | Do. |

*Example 7*

To establish that the tenderizing effects could be detected by normal consumers, not just by machines or by a trained panel, the following test was made. Ten rib rolls from canner-cutter cows were obtained. Five of these were pumped to 20% with a marinade containing 4.8% salt and 2.5% sodium tripolyphosphate. The other five were held as control. All rolls were vacuum packaged in plastic film and held 7 days at 36–38 degrees to approximate shipping and market handling.

The meat was roasted to an internal temperature of 165 degrees and served to a church group of 115 men and women. In line with this church meeting, the meats were coded S, T. Each person was given two pieces of meat, both coded, and made his personal evaluation of each. A summary of all ratings follows:

Panel—115 persons attending a church meeting (representing divergent areas and backgrounds)
Coded samples:
  S (control)
  T (marinated)
Ratings:
  Flavor—
    Prefer S _____ 10
    Prefer T _____ 97
    Found the flavors identical _____ 17
  Tenderness—
    S was more tender _____ 9
    T was more tender _____ 100
    Both were equally tender _____ 5
    Both were equally tough _____ 1

For clarification, one ballot was not counted, since every item had been checked. Some ballots contained more than one check per question, hence the discrepancy between total votes and number of panel.

*Example 8*

As a phase of Example 7, one fresh loin from the test lot of rib rolls had been cut into two halves, the one half pumped to 20% with the marinade (4.8% salt and 2.5% sodium tripolyphosphate). The other half was not pumped, serving as a control. Part of each piece was used for tenderness rating by the trained laboratory panel. The rest of each piece was shipped refrigerated to an independent laboratory for shear press determinations. We stress that all of these values were on the one muscle, the one piece being control and the other tendered by the marinade treatment.

TRAINED LABORATORY PANEL (9 MEMBERS)

| Sample Code | Meat | Marinade, percent | | Flavor | | | Tenderness | | Toughness | |
|---|---|---|---|---|---|---|---|---|---|---|
| | | NaCl | Phosphate | Above avg. | Avg. | Below avg. | Tender | Mushy | Chewy | Fibrous residue |
| S | Control | None | None | 1 | 6 | 0 | 5 | 0 | 5 | 0 |
| T | Marinated | 4.8 | 2.5 | 3 | 4 | | 8 | 2 | 0 | 0 |

Comparative ratings:
  More tender: S—0; T—9 [1]
  Over-all best: S—1; T—6; Equal—1 [2]
  [1] Both acceptable tenderness—2.
  [2] S best flavor, T most tender.
Shear Press data:
  Machine—L.E.E. Kramer Shear Press (electronic model).
  Set on 1000 lb. range, 30 second downstroke.

Raw samples—2⅝ x 2⅝ x ½ inch, cut longitudinal to the muscle fibers, avoiding the larger pieces of connective tissue.
Cooked samples—Approximately 1-lb. piece wrapped in foil, baked in electric oven at 300° F. with strip-chart recording thermocouples in center. Roasted to 167 degrees internal temperature, then cooled 18 hours at 40° F. Sample handling then same as for raw.

RESULTS

| Sample | Run | Weight sample (grams) | Maximum shear (lbs.) | Shear (lb./gm.) | Average shear (lb./gm.) |
|---|---|---|---|---|---|
| S (control)—raw | 1 | 38.0 | 528 | 13.9 | |
| | 2 | 30.0 | 373 | 12.4 | |
| | 3 | 35.8 | 479 | 13.4 | |
| | 4 | 32.1 | 253 | 7.9 | 11.9 |
| S—cooked | 1 | 35.2 | 453 | 12.9 | |
| | 2 | 35.3 | 467 | 13.2 | |
| | 3 | 34.4 | 428 | 11.0 | |
| | 4 | 34.1 | 499 | 14.6 | 12.9 |
| T (marinated)—raw | 1 | 37.1 | 701 | 18.9 | |
| | 2 | 38.3 | 327 | 8.5 | |
| | 3 | 38.9 | 808 | 20.8 | |
| | 4 | 36.4 | 554 | 15.2 | 15.8 |
| T—cooked | 1 | 37.1 | 237 | 6.4 | |
| | 2 | 35.4 | 261 | 7.4 | |
| | 3 | 34.6 | 281 | 8.1 | |
| | 4 | 34.6 | 275 | 7.9 | 7.4 |

Variations between the 4 samples of 1 group are believed to be caused by variations in connective tissue. The increase in shear with cooking is normal for loin (longissimus dorsi). The higher reading for T-raw (relative to S-raw) is probably due to the relative amounts of connective tissue. The sharply reduced readings for the T-cooked—both the average and the pound per gram range—clearly show mechanical verification of the various taste and consumer panel ratings of tenderization.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the appended claims.

We claim:
1. The process of tenderizing beef comprising injecting into the beef approximately 15%–40% by weight of a composition comprising approximately 2% to 10% by weight of salt and approximately 1%–4% phosphate to produce in the beef up to approximately .5% by weight phosphate and up to approximately 1.8% by weight of salt.

2. The process of tenderizing beef comprising injecting into the beef approximately 20%–25% by weight of a composition comprising 2%–10% by weight salt and 1%–4% phosphate to produce in the beef up to approximately .5% by weight phosphate and up to approximately 1.8% by weight of salt.

3. The process of tenderizing beef consisting of injecting into the beef approximately 20%–25% by weight of a composition consisting of 2.5%–7% by weight salt and 1%–4% phosphate to produce in the beef up to approximately .5% by weight phosphate and up to approximately 1.8% by weight of salt.

References Cited by the Examiner

UNITED STATES PATENTS

| 2,140,781 | 12/38 | Allen | 99—107 |
| 2,903,366 | 9/59 | Barnett | 99—159 |
| 2,999,019 | 9/61 | Hopkins et al. | 99—107 |
| 3,028,246 | 4/62 | Oliver et al. | 99—107 X |
| 3,049,428 | 8/62 | Hopkins et al. | 99—107 X |

A. LOUIS MONACELL, *Primary Examiner.*

HYMAN LORD, *Examiner.*